United States Patent Office

3,507,954
Patented Apr. 21, 1970

3,507,954
BENZENESULFONYL-UREAS AS
ANTI-DIABETIC AGENTS
Helmut Weber, Frankfurt am Main, Walter Aumuller,
Kelkheim, Taunus, Rudi Weyer, Frankfurt am Main,
Karl Muth, Kelkheim, Taunus, and Felix Helmut
Schmidt, Mannheim-Neuostheim, Germany, assignors
to Farbwerke Hoechst Aktiengesellschaft vormals
Meister Lucius & Bruning, Frankfurt am Main, Germany, a corporation of Germany
No Drawing. Original application July 13, 1966, Ser. No.
564,743, now Patent No. 3,454,635. Divided and this
application Mar. 3, 1969, Ser. No. 813,387
Claims priority, application Germany, July 27, 1965,
F 46,721; Dec. 21, 1965, F 47,816
Int. Cl. A61k *27/00*
U.S. Cl. 424—321        15 Claims

ABSTRACT OF THE DISCLOSURE

Benzenesulfonyl ureas of the formula

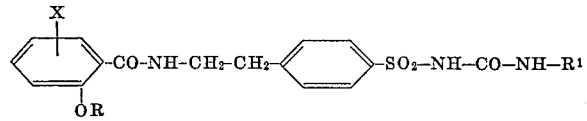

wherein:
R represents alkyl of 1 to 5 carbon atoms or lower alkenyl,
X represents halogen, preferably chlorine, lower alkyl, preferably methyl, or lower alkoxy, preferably methoxy,
$R^1$ represents cyclohexyl, methylcyclohexyl or ethylcyclohexyl, methyl and ethyl being preferably in 4-position of the cyclohexyl radical, endomethylene-cyclohexenylmethyl or endomethylene-cyclohexylmethyl, and physiologically tolerable salts thereof are found to have hypoglycemic activity in the treatment of diabetes upon oral administration in dosages of 0.5 to 100, preferably 2 to 10 milligrams.

---

This application is a division of our copending application Ser. No. 564,743 filed July 13, 1966, now U.S. Patent No. 3,454,635.

The present invention provides benzenesulfonyl-ureas of the formula

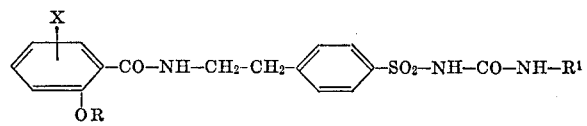

which in free form or in the form of their salts have blood sugar lowering properties and which are distinguished by a strong and long lasting hypoglycemic action.

In the above formula
R represents alkyl of 1 to 5 carbon atoms or lower alkenyl,
X represents halogen, preferably chlorine, lower alkyl, preferably methyl, or lower alkoxy, preferably methoxy,
$R^1$ represents cyclohexyl, methylcyclohexyl or ethylcyclohexyl, methyl and ethyl being preferably in 4-position of the cyclohexyl radical, endomethylene-cyclohexenylmethyl or endomethylenecyclohexylmethyl.

The substituent X is preferably in 4-position or in 5-position to the carbonamide group.

The terms "lower alkyl" or "lower alkenyl" are used throughout the specification to mean an alkyl or alkenyl radical containing 1–4 carbon atoms in a straight or branched chain.

In correspondence with the definitions given above, R may represent, for example, methyl, ethyl, propyl, isopropyl, butyl, isobutyl, tert. butyl, isoamyl, allyl.

$R^1$ may represent, for example, cyclohexyl, 4-methylcyclohexyl (preferably in trans form), 4-ethylcyclohexyl, 2,5-endomethylene-cyclohexenyl-methyl, 2,5-endomethylene-cyclohexylmethyl.

The benzenesulfonyl-ureas of the present invention can be prepared by methods which are generally used for the preparation of compounds of this class. Thus, they can be prepared by (a) Reacting benzenesulfonyl isocyanates, benzenesulfonyl carbamic acid esters, benzenesulfonyl thiocarbamic acid esters, benzenesulfonyl carbamic acid halides or benzenesulfonyl-ureas carrying the substituent

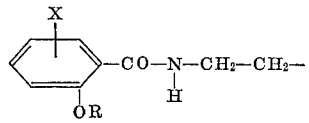

in p-position with $R^1$-substituted amines or their salts;
(b) Reacting benzenesulfonamides of the formula

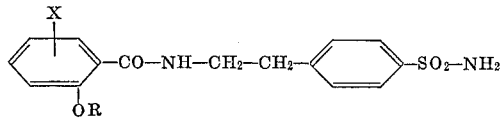

or their salts with $R^1$-substituted isocyanates, carbamic acid esters, thiocarbamic acid esters, carbamic acid halides or ureas;
(c) Reacting correspondingly substituted benzenesulfonyl-halides with $R^1$-substituted ureas, isourea ethers, isothiourea ethers or parabanic acids and hydrolysing the benzenesulfonyl-isourea ethers, benzenesulfonyl-isothiourea ethers or benzenesulfonyl parabanic acids obtained in this way or by another method;
(d) Replacing the sulfur atom in known manner in correspondingly substituted benzenesulfonyl-thioureas by an oxygen atom;
(e) Oxidizing correspondingly substituted benzenesulfonyl-ureas or benzenesulfonyl-ureas; or
(f) Introducing by acylation the radical

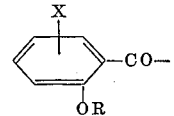

in one or several steps into benzenesulfonyl-ureas of the formula

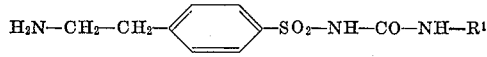

and, if desired, converting the reaction products into salts by treatment with an alkaline agent.

Instead of benzenesulfonyl isocyanates, there may also be used reaction products of benzenesulfonyl isocyanates with acid amides such as caprolactam or butyrolactam, further with weakly basic amines such as carbazoles.

The benzenesulfonyl-carbamic acid esters or benzenesulfonyl-thiocarbamic acid esters may carry in the alcohol component a low molecular weight alkyl group or a phenyl group. The same applies to the $R^1$-substituted carbamic acid esters or the corresponding monothiocarbamic acid esters. By a low molecular weight or lower alkyl radical, there is to be understood in the sense of the present invention an alkyl radical containing no more than 4 carbon atoms.

As carbamic acid halides, the chlorides are advantageously used.

The benzenesulfonyl-ureas used as starting substances in the process of the present invention may be unsubstituted at the side of the urea molecule opposite to the sulfonyl group or may be mono- or di-substituted, preferably by low molecular weight alkyl or aryl radicals; instead of benzenesulfonyl-ureas substituted in such manner, there may also be used corresponding N-benzenesulfonyl-N'-acyl-ureas (acyl-lower molecular weight aliphatic acyl such as acetyl, propionyl or butyryl, but also benzoyl), and even bis(benzenesulfonyl)-ureas. Such bis-(benzenesulfonyl)-ureas or N-benzenesulfonyl-N'-acyl-ureas may be treated, for example, with amines of the formula $R^1NH_2$ and the salts obtained may be heated to elevated temperatures, in particular to temperatures above 100° C.

It is also possible to start from ureas of the formula $R^1-NH-CO-NH_2$ or from acylated ureas of the formula $R^1-NH-CO-NH-$ acyl, in which acyl represents a preferably low molecular weight aliphatic or aromatic acid radical or a nitro group, or from phenyl-ureas of the formula $R^1-NH-CO-NH-C_6H_5$ or from diphenyl-ureas of the formula $R^1-NH-CO-N(C_6H_5)_2$, in which the phenyl groups may be substituted and may be linked with one another directly or by means of a bridge member, such, for example, as $-CH_2-$, $-NH-$, $-O-$ or $-S-$, or from N,N'-disubstituted ureas of the formula $R^1-NH-CO-NH-R^1$ and to react these compounds with

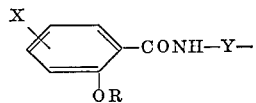

substituted benzenesulfonamides.

In the correspondingly substituted benzenesulfonyl-thioureas, the sulfur atom can be replaced by an oxygen atom, for example, with the aid of oxides or salts of heavy metals or by the use of oxidizing agents such, for example, as hydrogen peroxide sodium peroxide or nitrous acid.

The thioureas can likewise be desulfurized by treatment with phosgene or phosphorus pentachloride. Chloroformic acid amidines or chloroformic acid carbodiimides obtained as intermediates can be converted into the benbenesulfonyl-ureas by an appropriate treatment, for example, by hydrolysis or the addition of water.

In analogous manner as the thioureas behave the corresponding isothiourea ethers which, in the sense of the invention, are equivalent as starting substances for the desulfurizing reactions.

With regard to the reaction condition, the manner of carrying out the process of the present invention may, in general, vary within wide limits and can be adapted to each individual case. For example, the reactions can be carried out with the use of solvents, at room temperature or at an elevated temperature.

As starting substances, there may be used compounds which contain a benzene radical which is substituted by the group

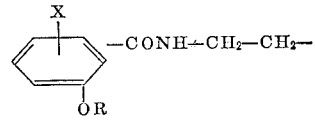

in p-position.

Examples of the component

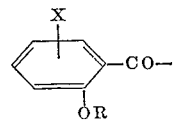

of the above-indicated formula are:

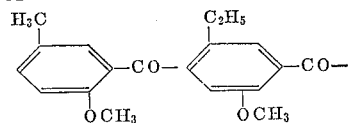

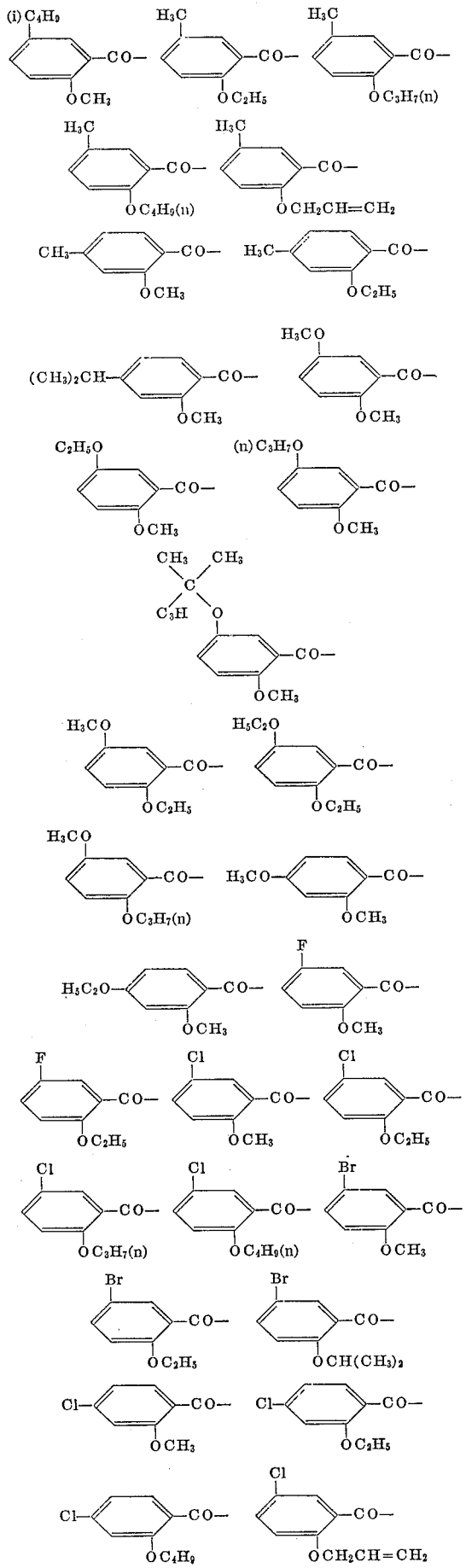

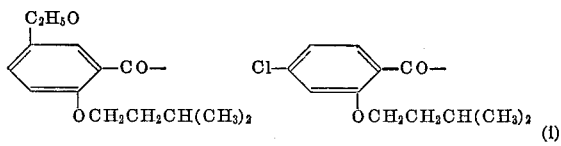

The blood sugar lowering action of the described benzenesulfonyl-ureas was ascertained by feeding them, for example, to rabbits in doses of 10 mg./kg. of body weight and determining the blood sugar value according to the known method of Hagedorn-Jensen or by means of an autoanalyser for a prolonged period of time.

The results obtained in this manner are listed in the following table, the Roman numbers standing for the following compounds:

(I) N-[4-($\beta$-<2-methoxy-5-methyl-benzamido>-ethyl)-benzenesulfonyl]-N'-cyclohexylurea (II) N-[4-($\beta$-<2-methoxy-5-chloro-benzamido>-ethyl)-benzenesulfonyl]-N'-(4-methyl-cyclohexyl)-ureau (trans)

(III) N-[4-($\beta$-<2-methoxy-4-methylbenzamido>-ethyl)-benzenesulfonyl]-N'-(4-methyl-cyclohexyl)-urea (IV) N-[4-($\beta$-<2-methoxy-5-chloro-benzamido>-ethyl)-benzenesulfonyl]-N'-cyclohexyl-urea (V) N-[4-($\beta$-<2-isoamyloxy-5-methyl-benzamido>-ethyl)-benzenesulfonyl]-N'-(4-methyl-cyclohexyl) urea (VI) N-(4-methyl-benzenesulfonyl)-N'-n-butyl-urea (Tolbutamide)

TABLE 1

| Compound | Dose (mg./kg.) | Blood-sugar lowering (hrs.) in percent after— | | | |
|---|---|---|---|---|---|
| | | 3 | 24 | 48 | 72 |
| I | 10 | 9 | 24 | 12 | 0 |
| II | 10 | 15 | 27 | 19 | 0 |
| III | 10 | 37 | 25 | 28 | 19 |
| IV | 10 | 19 | 23 | 28 | 13 |
| V | 10 | 37 | 41 | 0 | |
| VI | <25 | 0 | | | |

The strong hypoglycemic action of the benzenesulfonyl-ureas of the present invention becomes more evident when the dose is further reduced. When I is administered to a rabbit in a dose of 0.005 mg./kg. or when II is administered in a dose of 0.02 mg./kg. or when III is administered in a dose of 0.02 mg./kg. or when IV is administered in a dose of 0.02 mg./kg., a distinct lowering of the blood sugar can still be observed in rabbits.

The benzenesulfonyl-ureas described are preferably used for the manufacture of orally administrable pharmaceutical preparations for the lowering of the blood sugar level in the treatment of diabetes mellitus and may be used as such or in the form of their physiologically tolerable salts or in the presence of substances which causes such salt formation. For the formation of salts, there may be used, for example, alkaline agents such, for example, as alkali metal hydroxides or alkaline earth metal hydroxides, alkali metal carbonates or bicarbonates, or also organic bases, in particular tertiary nitrogen bases, provided the resulting salts are physiologically tolerable.

The invention therefore, also provides pharmaceutical preparations of the above kind which comprise a benzenesulfonylurea of the present invention in admixture or conjunction with a pharmaceutically suitable carrier.

The pharmaceutical preparations are advantageously in the form of tablets and the pharmaceutically suitable carrier may be, for example, talc, starch, lactose, tragacanth or magnesium stearate.

A pharmaceutical preparation containing one of the aforesaid benzenesulfonyl-ureas as active substance, for example, a tablet or a powder, with or without the aforesaid carriers is advantageously brought into a suitable unit dosage form. The dose chosen should comply with the activity of the benzenesulfonyl-urea used and the desired effect. Advantageously, the dosage per unit amounts to about 0.5 to 100 milligrams, preferably 2 to 10 milligrams, but considerably higher or lower dosage unit may also be used, which, if desired, are divided or multiplied prior to their administration.

The following examples illustrate the invention, but they are not intended to limit it thereto:

EXAMPLE 1

N-[4-($\beta$-<2,5-dimethoxy-benzamindo>-ethyl)-benzenesulfonyl]-N'-cyclohexyl-urea 9.1 grams of 4-($\beta$-<2,5-dimethoxy-benzamido>-ethyl)-benzenesulfonamide (melting point 193–194° C.) are dissolved in 12.5 milliliters of 2 N sodium hydroxide solution and 30 milliliters of acetone; to this solution are added dropwise, at 0–5° C., 3.3 grams of cyclohexyl isocyanate. The whole is stirred for 3 hours, diluted with water and methanol, undissolved matter is separated by filtration, and the filtrate is acidified with dilute hydrochloric acid. The N-[4-$\beta$-<2,5-dimethoxy-benzamido>-ethyl)-benzenesulfonyl]-N'-cyclohexyl-urea which precipitates in the form of crystals melts after recrystallization from methanol at 143–145° C.

In analogous manner, there are obtained:

N-[4-($\beta$-<2,5 - dimethoxy - benzamido>-ethyl)-benzenesulfonyl] - N'-(4-methyl - cyclohexyl)-urea (trans), melting point 155–156° C. (from methanol);

From 4-($\beta$-<2-methoxy - 5 - ethoxy - benzamindo>-ethyl)-benzenesulfonamide, melting point 190–191° C.;

N-[4-($\beta$-<2-methoxy - 5 - ethoxy - benzamido>-ethyl)-benzenesulfonyl]-N'-cyclohexyl-urea, melting point 146–148° C. (from methanol), N-[4-($\beta$-<2-methoxy - 5 - ethoxy-benzamido>-ethyl)-benzenesulfonyl]-N'-(4-methyl - cyclohexyl - urea (trans), melting point 130–132° C. (from methanol), and N - [4 - ($\beta$-<2-methoxy-5-ethoxy-benzamido>-ethyl)-benzene-sulfonyl]-N'-(4-ethyl-cyclohexyl) - urea (trans), melting point 108–110° C. (decomp.) (from methanol);

From 4 - ($\beta$-<2,4-dimethoxy-benzamido>-ethyl)-benzene-sulfonamide, melting point 200–202° C;

N-[4-($\beta$-<2,4-dimethoxy-benzamido>-ethyl)- benzenesulfonyl]-N'-cyclohexyl-urea, melting point 193–194° C. (from methanol).

N - [4 - ($\beta$ - <2,4-dimethoxy-benzamido>-ethyl)-benzenesulfonyl] - N'-(4-methyl-cyclohexyl)-urea (trans), melting point 208–210° C. (from methanol/dimethylformamide);

From 4-($\beta$-<2-methoxy-4-ethoxy-benzamido>-ethyl)-benzene-sulfonamide (melting point 183–185° C.);

N - [4 - ($\beta$-<2-methoxy-4-ethoxy-benzamido>-ethyl)-benzene-sulfonyl]-N'-cyclohexyl-urea, melting point 172–174° C. (from methanol);

From 4 - ($\beta$-<2-methoxy-5-fluorobenzamido>-ethyl)-benzene-sulfonamide, melting point 167–169° C.;

N - [4-($\beta$-<2-methoxy-5-fluoro-benzamido>-benzenesulfonyl]-N'-cyclohexyl-urea, melting point 176–178° C. (from methanol).

N - [4 - ($\beta$ - <2-methoxy-5-fluoro-benzamido>-ethyl)-benzenesulfonyl]-N'-(4-methyl-cyclohexyl) - urea trans), melting point 185–187° C. (from methanol/dimethylformamide) and N - [4 - ($\beta$-<2-methoxy-5-fluoro-benzamido>-ethyl)-benzenesulfonyl]-N'-(4-ethyl-cyclohexyl) - urea (trans), melting point 179–180° C. (from methanol/dimethylformamide);

From 4-($\beta$-<2-methoxy-5-bromo-benzamido>-ethyl)-benzene-sulfonamide, melting point 223–224° C.;

N - [($\beta$-<2-methoxy-5-bromo-benzamido>-ethyl)-benzenesulfonyl] - N'-cyclohexyl-urea, melting point 161–163° C. (from methanol).

N - [($\beta$-<2-methoxy-5-bromo-benzamido>-ethyl)-benzenesulfonyl]-N'-(4-methyl - cyclohexyl) - urea (trans), melting point 187–189° C. (from methanol);

From 4 - ($\beta$ - <2-ethoxy-5-chloro-benzamido>-ethyl)-benzene-sulfonamide. melting point 168–170° C.;

N - [4-(β-<2-ethoxy-5-chloro-benzamido>-ethyl)-benzenesulfonyl]-N'-cyclohexyl-urea, melting point 171–173° C. (from methanol).

N - [4-(β-<2-ethoxy-5-chloro-benzamido>-ethyl)-benzenesulfonyl]-N'-(4-methyl-cyclohexyl) - urea (trans), melting point 156–158° C. (from methanol), and N - [4-(β-<2-ethoxy-5-chloro-benzamido>-ethyl)-benzenesulfonyl] - N' - (4-ethyl-cyclohexyl) - urea (trans), melting point 135–137° C. (from methanol);

From 4 - (β - <2-n-propoxy - 5 - chloro-benzamido>-ethyl)-benzene-sulfonamide (melting point 192–194° C.);

N - [4-(β-<2-n-propoxy-5-chloro-benzamido>-ethyl)-benzenesulfonyl]-N'-cyclohexyl-urea, melting point 166–168° C. (from methanol), and N - [4-(β-<2-n-propoxy-5-chloro-benzamido>-ethyl)-benzenesulfonyl]-N'-(4-methyl-cyclohexyl)- urea (trans) melting point 160–161° C. (from methanol);

From 4-(β-<2-allyloxy-5-chloro-benzamido>-ethyl)-benzenesulfonamide, melting point 183–184° C.;

N - [4 - (β - <2-allyloxy-5-chloro-benzamido>-ethyl)-benzenesulfonyl]-N'-cyclohexyl-urea, melting point 155–157° C. (from methanol).

N - [4 - (β - <2-allyloxy-5-chloro-benzamido>-ethyl)-benzenesulfonyl]-N'-(4-methyl-cyclohexyl)-urea (trans), melting point 159–161° C. (from methanol), and N - [4 - (β - <2-allyloxy-5-chloro-benzamido>-ethyl)-benzenesulfonyl]-N'-(4-ethyl-cyclohexyl) - urea (trans), melting point 162–164° C. (from methanol);

From 4 - (β-<2-methoxy-4-chloro-benzamido>-ethyl)-benzene-sulfonamide, melting point 187–188° C.;

N - [4 - (β-<2-methoxy-4-chloro-benzamido>-ethyl)-benzenesulfonyl]-N'-cyclohexyl-urea, melting point 200–201° C. (from methanol/dimethylformamide).

N - [4 - (β-<2-methoxy-4-chloro-benzamido>-ethyl)-benzenesulfonyl]-N'-(4-methyl-cyclohexyl)-urea (trans), melting point 204–205° C. (from methanol/dimethylformamide), and N - [4 - (β-<2-methoxy-4-chloro-benzamido>-ethyl)-benzenesulfonyl]-N'-(4-ethyl-cyclohexyl) - urea (trans), melting point 184–186° C. (from methanol/dimethylformamide);

From 4 - (β-<2-ethoxy-5-methyl-benzamido>-ethyl)-benzene-sulfonamide, melting point 147–148° C.;

N - [4 - (β-<2-ethoxy-5-methyl-benzamido>-ethyl)-benzenesulfonyl]-N'-cyclohexyl-urea, melting point 159–161° C. (from methanol), and N - [4 - (β-<2-ethoxy-5-methyl-benzamido>-ethyl)-benzenesulfonyl]-N'-(4-methyl-cyclohexyl)-urea, melting point 181-182° C. (from methanol/dimethylformamide);

From 4 - (β-<2-allyloxy-5-methyl-benzamido>-ethyl)-benzene-sulfonamide, melting point 140–141° C.;

N - [4 - (β - <2-allyloxy-5-methyl-benzamido>-ethyl)-benzenesulfonyl]-N'-cyclohexyl-urea, melting point 156–158° C. (from methanol) and N - [4 - (β - <2-allyloxy-5-methyl-benzamido>-ethyl)-benzenesulfonyl]-N'(4-methyl-cyclohexyl)-urea, melting point 143–145° C. (from methanol);

From 4 - (β-<2-methoxy-4-methyl-benzamido>-ethyl)-benzene-sulfonamide, melting point 188–189° C.;

N - [4 - (β-<2-methoxy-4-methyl-benzamido>-ethyl)-benzenesulfonyl]-N'-cyclohexyl-urea, melting point 209–211° C. (from methanol/dimethylformamide);

N - [4 - (β-<2-methoxy-4-methyl-benzamido>-ethyl)-benzenesulfonyl]-N'-(4-methyl-cyclohexyl)-urea (trans), melting point 208–209° C. (from methanol/dimethylformamide), and N - [4 - (β-<2-methoxy-4-methyl-benzamido>-ethyl)-benzene-sulfonyl]-N'-(4-ethyl-cyclohexyl) - urea (trans), melting point 168–169° C. (from methanol);

From 4(β- <2-methoxy-5-chloro-benzamido>-ethyl)-benzene-sulfonamide, melting point: 214–216° C.;

N - [4 - (β-<2-methoxy-5-chloro-benzamido>-ethyl)-benzenesulfonyl]-N'-(3-methyl-cyclohexyl)-urea, melting point 181–183° C. (from methanol), and N - [4 - (β-<2-methoxy-5-chloro-benzamido>-ethyl)-benzenesulfonyl]-N'-(2-methyl-cyclohexyl)-urea, melting point 164–166° C. (from methanol);

From 4 - (β-<2-methoxy-4-chloro-benzamido>-ethyl)-benzene-sulfonamide, melting point 185–186° C.

N-[4-(β-<2-methoxy - 4 - chloro-benzamido>-ethyl)-benzene - sulfonyl]-N'-(2,5-endomethylene - cyclohexylmethyl)-urea, melting point 182–184° C. (from methanol);

From 4-(β-<2-methoxy - 5 - bromo - benzamido>-ethyl)-benzene-sulfonamide, melting point 224–225° C.;

N-[4-(β-<2-methoxy - 5 - bromo - benzamido>-ethyl)-benzene-sulfonyl]-N'-(4-ethyl-cyclohexyl)-urea (trans), melting point 186–188° C. (from methanol);

From 4-(β-<2-ethoxy - 5 - methyl-benzamido>-ethyl)-benzene-sulfonamide, melting point 147–148° C.;

N-[4-(β-<2-ethoxy - 5 - methylbenzamido>-ethyl)-benzene - sulfonyl]-N'-(4-ethyl-cyclohexyl)-urea (trans), melting point 179–181° C. (from methanol);

From 4-(β-<2-n-propoxy - 5 - methyl-benzamido>-ethyl)-benzene-sulfonamide, melting point 166–167° C.;

N-[4-(β-<2-n-propoxy - 5 - methyl - benzamido>-ethyl)-benzene-sulfonyl] - N' - cyclohexyl-urea, melting point 135–137° C. (from methanol), and N-[4-(β-<2-n-propoxy - 5 - methyl - benzamido>-ethyl) - benzene-sulfonyl] - N' - (4-methyl-cyclohexyl)-urea (trans), melting point 146–147° C. (from methanol);

From 4-(β-<2-ethoxy - 4 - chloro-benzamido>-ethyl)-benzene-sulfonamide, melting point 177–178° C.;

N-[4-(β-<2-ethoxy - 4 - chloro-benzamido>-ethyl)-benzene-sulfonyl] - N' - cyclohexylurea, melting point 184–185° C. (from methanol), and N-[4-(β-<2-ethoxy - 4 - chloro - benzamido>-ethyl)-benzene - sulfonyl] - N' - (4-methyl-cyclohexyl)-urea (trans), melting point 196–197° C. (from methanol);

From 4-(β-<2-ethoxy - 5 - bromo-benzamido>-ethyl)-benzene-sulfonamide, melting point 182–183° C.;

N-[4-(β-<2-ethoxy - 5 - bromo - benzamido>-ethyl)-benzene-sulfonyl] - N' - cyclohexyl-urea, melting point 166–168° C. (from methanol), N-[4-(β-<2-ethoxy - 5 - bromo - benzamido>-ethyl)-benzene-sulfonyl] - N' - (4-methyl-cyclohexyl) - urea (trans), melting point 153–155° C. (from methanol), and N-[4-(β-<2-ethoxy - 5 - bromo-benzamido>-ethyl)-benzene-sulfonyl] - N' - (4-methyl-cycloheyl) - urea (trans), melting point 167–169° C. (from methanol);

From 4-(β-<2-n-butoxy - 5 - methyl - benzamido>-ethyl)-benzene-sulfonamide, melting point 149–151° C.;

N-[4-(β-<2-n-butoxy - 5 - methyl-benzamido>-ethyl)-benzene-sulfonyl] - N' - cyclohexyl-urea, melting point 151–152° C. (from methanol), and N-[4-(β-<2-n-butoxy - 5 - methyl-benzamido>-ethyl)-benzene-sulfonyl] - N' - (4-methyl-cyclohexyl) - urea (trans), melting point 173–174° C. (from methanol);

From 4-(β-<2-ethoxy - 5 - fluoro - benzamido>-ethyl)-benzene-sulfonamide, melting point 171–173° C.;

N-[4-(β-<2-ethoxy - 5 - fluoro - benzamido>-ethyl)-benzene-sulfonyl] - N' - cyclohexyl-urea, melting point 134–136° C. (from methanol), N-[4-(β-<2-ethoxy - 5 - fluoro - benzamido>-ethyl)-benzene-sulfonyl]-N'-(4-methyl-cyclohexyl) - urea, melting point 149–151° C. (from methanol) and N-[4-(β-<2-ethoxy - 5 - fluoro - benzamido>-ethyl)-benzene-sulfonyl] - N' - (4-methyl-cyclohexyl) - urea, melting point 165–167° C. (from methanol);

From 4-(β-<2-n-propoxy - 5 - fluoro - benzamido>-ethyl)-benzene-sulfonamide, melting point 180–182° C.;

N-[4-(β-<2-n-propoxy - 5 - fluoro-benzamido>-ethyl)-benzene-sulfonyl] - N' - cyclohexyl-urea, melting point 165–167° C. (from methanol) and N-[4-(β-<2-n-propoxy - 5 - fluoro-benzamido>-ethyl)-benzene-sulfonyl] - N' - (4-methyl-cyclohexyl) - urea (trans), melting point 181–182° C. (from methanol);

From 4-(β-<2-methoxy - 5 - ethyl-benzamido>-ethyl)-benzene-sulfonamide, melting point 193–195° C.;

N-[4-(β-<2-methoxy - 5 - ethyl - benzamido>-ethyl)-benzene-sulfonyl] - N' - cyclohexyl-urea, melting point 160–162° C. (from methanol), N-[4-(β-<2-methoxy - 5 - ethyl - benzamido>-ethyl)-benzene-sulfonyl] - N' - (4 - methyl - cyclohexyl) - urea (trans), melting point 180–181° C. (from methanol), and N-[4-(β-<2-methoxy - 5 - ethyl - benzamido>-ethyl)-benzene - sulfonyl] - N' - (4-ethyl-cyclohexyl) - urea (trans), melting point 110–112° C. (from methanol);

From 4-(β-<2-methoxy - 5 - tert. butyl-benzamido>-ethyl)-benzene-sulfonamide, melting point 166–167° C.;

N-[4-(β-<2-methoxy - 5 - tert. butyl - benzamido>-ethyl)-benzene-sulfonyl] -N' - cyclohexyl-urea, melting point 136–138° C. (from methanol), and N-[4-(β-<2-methoxy - 5 - tert. butyl - benzamido>-ethyl)-benzene-sulfonyl] - N' - (4-methyl - cyclohexyl)-urea (trans), melting point 120–122° C. (from methanol);

From 4-(β-<2-methoxy - 5 - isopropyl-benzamido>-ethyl)-benzene-sulfonamide, melting point 192–194° C.;

N-[4-(β-<2-methoxy - 5 - isopropyl - benzamido>-ethyl)-benzene-sulfonyl] - N' - cyclohexyl-urea, melting point 116–118° C. (from methanol), and N-[4-(β-2-methoxy - 5 - isopropyl-benzamido-ethyl)-benzenesulfonyl] - N' - (4-methyl - cyclohexyl) - urea (trans), melting point 188–189° C. (from methanol);

From 4-(β-<2-ethoxy - 5 - ethyl-benzamido>-ethyl)-benzene-sulfonamide, melting point 139–141° C.;

N-[4-(β-<2-ethoxy - 5 - ethyl - benzamido>-ethyl)-benzene-sulfonyl] - N' - cyclohexyl-urea, melting point 149–152° C. (from methanol), N - [4 - (β-<2-ethoxy - 5 - ethyl - benzamido>-ethyl)-benzene-sulfonyl] - N' - (4-methyl-cyclohexyl) - urea (trans), melting point 171–173° C. (from methanol) and N-[4-(β-<2-ethoxy - 5 - ethyl - benzamido>-ethyl)-benzene - sulfonyl] - N' - (4-ethyl-cyclohexyl) - urea (trans), melting point 153–155° C. (from methanol);

From 4-(β-<2-methoxy-4-bromo-benzamido>-ethyl)-benzene-sulfonamide, melting point 202–203° C.;

N-[4-(β<2-methoxy - 4 - bromo-benzamido>-ethyl)-benzene-sulfonyl]-N'-cyclohexyl-urea, melting point 201–203° C. (from methanol/dimethylformamide); and N-[4-(β-<2-methoxy - 4 - bromo-benzamido>-ethyl)-benzene-sulfonyl]-N'-(4-methyl-cyclohexyl)-urea (trans), melting point 205–206° C. (from methanol/dimethylformamide);

From 4 - (β-<2-methoxy-5-iodo-benzamido>-ethyl)-benzene-sulfonamide, melting point 236–237° C.;

N-[4-(β-<2-methoxy - 5 - iodo-benzamido>-ethyl)-benzene-sulfonyl]-N'-cyclohexyl-urea, melting point 169–170° C. (from methanol); and N-[4-(β-<2-methoxy - 5 - iodo-benzamido->ethyl)-benzene-sulfonyl]-N'-(4-methyl-cyclohexyl)-urea (trans), melting point 141–143° C. (from methanol;

From 4-(β-<2-allyloxy - 5 - fluoro-benzamido>-ethyl)-benzene-sulfonamide, melting point 160–162° C.;

N-[4-(β-<2-allyloxy - 5 - fluoro-benzamido>-ethyl)-benzene-sulfonyl]-N'-cyclohexyl-urea, melting point 153–155° C. (from methanol); and N-[4-(β-<2-allyloxy - 5 - fluoro-benzamido>-ethyl)-benzene-sulfonyl]-N'-(4-methyl-cyclohexyl)-urea (trans), melting point 152–154° C. (from methanol).

EXAMPLE 2

N-[4-(β-<2-methoxy-5-methyl-benzamido>-ethyl)-benzenesulfonyl]-N'-cyclohexyl-urea 7 grams of N-[4-(β-<2-methoxy-5-methyl-benzamido>-ethyl)-benzenesulfonyl] - methyl-urethane (melting point 175–177° C.) are suspended in 200 milliliters of xylene and combined at 80° C. with 1.9 grams of cyclohexylamine. After a short time, the temperature of the oil bath is raised to 150° C. and held for 30 minutes at this temperature. During that time the reaction mixture dissolves and the methanol separates by distillation. Upon cooling, the N-[4-(β-<2-methoxy-5-methyl-benzamido>-ethyl)-benzenesulfonyl]-N'-cyclohexyl-urea precipitates in the form of crystals; after recrystallization from methanol/dimethylformamide, the compound melts at 187–188° C.

In analogous manner there are obtained:

N-[4-(β-<2-methoxy-5-methyl - benzamido>-ethyl)-benzenesulfonyl]-N'-(4-methyl-cyclohexyl)-urea (trans), melting point 157–159° C. (from methanol); and N-[4-(β-<2-methoxy - 5 - methyl-benzamido>-ethyl)-benzenesulfonyl]-N'-(3-methyl-cyclohexyl)-urea, melting point 176–178° C. (from methanol/dimethylformamide); and N-[4-(β-<2-methoxy - 5 - methyl-benzamido>-ethyl)-benzenesulfonyl] - N - (4-ethyl-cyclohexyl)-urea, melting point 164–166° C. (from methanol).

EXAMPLE 3

N-[4-(β-<2-methoxy-5-chloro-benzamido>-ethyl)-benzenesulfonyl]-N'-cyclohexyl-urea A mixture of 10.3 grams of N-[4-(β-<2-methoxy-5-chloro-benzamido>-ethyl)-benzenesulfonyl]-urea (melting point 171–173° C.), 300 milliliters of toluene, 30 milliliters of glycol-monomethyl ether, 1.65 grams of glacial acetic acid and 2.8 grams of cyclohexylamine is heated for 5 hours under reflux. The mixture is then concentrated under reduced pressure and the residue is treated with alcohol. The N-[4-(β-<2-methoxy-5-chloro-benzamido>-ethyl)-benzenesulfonyl] - N' - cyclohexyl-urea obtained as crude product is filtered off with suction and recrystallized from methanol. Melting point 169–170° C.

In analogous manner there are obtained:

N-[4-(β-<2-methoxy - 5 - chloro-benzamido>-ethyl)-benzenesulfonyl]-N'-(4-methyl-cyclohexyl)-urea (trans), melting point 189–190° C. (from methanol);

N-[4-(β-<2-methoxy - 5 - chloro-benzamido>-ethyl)-benzenesulfonyl]-N'-(4-ethyl-cyclohexyl) - urea (trans), melting point 184–185° C. (from methanol); and N-[4-(β-<2-methoxy - 5 - chloro-benzamido>-ethyl)-benzenesulfonyl]-N'-(2,5-endomethylene - $\Delta^3$ - cyclohexenylmethyl)-urea melting point 160–162° C. (from methanol).

EXAMPLE 4

N-[4-(β-<2-methoxy - 5 - methyl-benzamido>-ethyl)-benzenesulfonyl]-N'-(2,5 - endomethylene-cyclohexylmethyl)-urea (a) 3 grams of N-[4-(β-<2-methoxy-5-methyl-benzamido> - ethyl) - benzenesulfonyl]-N'-(2,5-endomethylene-cyclohexyl-methyl)-thiourea (prepared by the reaction of 4-(β-<2-methoxy-5-methyl-benzamido>-ethyl)-benzenesulfonamide with 2,5-endomethylene-cyclohexylmethyl-isothiocyanate in boiling acetone in the presence of potassium carbonate, melting point 165–167° C., from methanol/dimethylformamide) are suspended in 50 milliliters of 2 N sodium hydroxide solution. Then, 10 milliliters of 35% hydrogen peroxide are added. The whole is heated for 30 min. on the steam bath, acidified with dilute hydrochloric acid, the crystalline precipitate is filtered with suction and recrystallized from ethanol. The N-[4-(β-<2-methoxy - 5 - methyl-benzamido>-ethyl)-benzenesulfonyl] - N' - (2,5 - endomethylene-cyclohexylmethyl)-urea thus obtained melts, after recrystallization from methanol, at 142–144° C. The same compound is obtained by treating the thiourea mentioned at the beginning of this example with mercury oxide in the presence of sodium hydroxide solution, whereby it is desulfurized. For this purpose, 0.5 gram of the thiourea are dissolved in 10 milliliters of dioxane and 10 milliliters of 2 N sodium hydroxide solution. The solution is combined with 0.22 gram of HgO and stirred for 4 hours at 40° C. The mercury sulfide that has formed is separated by filtration with suction, the filtrate is acidified and the precipitate that has separated and that constitutes the N-[4-(β-<2-methoxy-5-methyl-benzamido>-ethyl) - benzenesulfonyl]-N' - (2,5-endomethylene-cyclohexyl-methyl)-urea is separated by filtration with suction and recrystallized from methanol. Melting point 142–144° C.

In analogous manner, there is obtained from N-[4-(β-<2-methoxy-5-chloro-benzamido> - ethyl) - benzenesulfonyl]-N'-(2,5-endomethylene-cyclohexyl-methyl) - thiourea (melting point 171–173° C.);

N-[4-(β-<2-methoxy - 5 - chloro-benzamido>ethyl)-benzene-sulfonyl] - N' - (2,5-endomethylene-cyclohexyl-methyl)-urea, melting point 181–183° C. (from methanol/dimethylformamide).

(b) 0.52 gram of N-[4-(β-<2-methoxy-5-methyl-benzamido>-ethyl)-benzenesulfonyl] - N' - (2,5-endomethylene-cyclohexyl-methyl)-thiourea is dissolved in 50 milliliters of methanol. 0.22 gram of mercury oxide and a small amount of $K_2CO_3$ are added, while stirring and the whole is heated for 3 hours to 50–55° C., while continuing stirring. After separation by filtration of the mercury oxide that has formed, the filtrate is concentrated and the residue constituting N-[4-(β-<2-methoxy-5-methyl-benzamido>-ethyl) - benzenesulfonyl]-N'-(2,5-endomethylene-cyclohexyl-methyl)-isourea-methyl ether is recrystallized from dilute methanol. The compound melts at 102–104° C.

Concentrated hydrochloric acid is poured over a sample of the above-mentioned isourea ether in a reaction tube and the whole is heated for some minutes on the steam bath, while stirring. The crystallisate of N-[4-(β-<methoxy - 5 - methyl-benzamido>-ethyl) - benzenesulfonyl] - N' - (2,5-endomethylene-cyclohexyl-methyl)-urea thus obtained is recrystallized from methanol. Melting point 142–144° C.

(c) 0.52 gram of N-[4-(β-<2-methoxy-5-methyl-benzamido>-ethyl)-benzenesulfonyl]-N'-(2,5-endomethylene-cyclohexyl-methyl)-thiourea is dissolved in 50 milliliters of methanol. After addition of 0.3 gram of methyl iodide, the whole is heated for 2½ hours under reflux to the boil. After concentration a resinous residue constituting N-[4-(β-<2-methoxy-5-methyl-benzamido>-ethyl)-benzenesulfonyl] - N' - (2,5-endomethylene-cyclohexylmethyl)-isothiourea methyl ether is obtained which is dissolved in 10 milliliters of dioxane. After addition of 20 milliliters of 2 N sodium hydroxide solution, the solution is heated for 1 hour on the steam bath. By introduction of water and acidification with hydrochloric acid, N-[4-(β-<2-methoxy-5-methyl-benzamido>-ethyl) - benzenesulfonyl]-N' - (2,5-endomethylene-cyclohexyl-methyl) - urea is obtained which melts at 142–144° C., after recrystallization from methanol.

In a manner analogous to that described in Example 4a, there are obtained:

From N-[4-(β-<2-methoxy - 5 - chloro-benzamido>-ethyl)-benzenesulfonyl] - N' - (2,5-endomethylene-cyclohexylmethyl)-thiourea, prepared from the corresponding sulfonamide and 2,5 - endomethylene-cyclohexyl-methyl-isothiocyanate (melting point: 171–173° C.):

N-[4-(β-<2-methoxy - 5 - chloro-benzamido>-ethyl)-benzenesulfonyl] - N' - (2,5-endomethylene-cyclohexyl-methyl)-urea, melting point 181–183° C. (from methanol/dimethylformamide).

EXAMPLE 5

N-[4-(β-<2-methoxy-5-chloro-benzamido>-ethyl)-benzenesulfonyl]-N'-cyclohexyl-urea (a) Potassium salt of N-[4-(β-methoxy-5-chloro-benzamido>-ethyl) - benzenesulfonyl] - imino-dithiocarbonic acid.—74 grams of 4-(β-<2-methoxy - 5 - chloro-benzamido>-ethyl)-benzenesulfonamide are dissolved in 350 milliliters of dimethylformamide. 23 grams of carbon disulfide and then a solution of 34 grams of potassium hydroxide in 50 milliliters of water are added dropwise, while stirring. Stirring is continued for 3 hours at room temperature and the clear solution is poured in 4 liters of ethanol. The potassium salt of N-[4-(β-<2-methoxy-5-chloro-benzamido>-ethyl) - benzenesulfonyl]-imino-dithiocarbonic acid which has precipitated is filtered off with suction, washed with alcohol and dried. Yield: 60 grams.

(b) N - [4-(β-<2-methoxy-5-chloro-benzamido>-ethyl)-benzenesulfonyl]-imino-dithiocarbonic acid dimethyl ester.—36 grams of the potassium salt obtained according to (a) are dissolved in 60 milliliters of 1 N-sodium hydroxide solution. 12.6 grams of dimethyl sulfate are added, while shaking, to the clear solution. The mixture heats up. After standing for 30 minutes, a semi-solid smeary paste is separated by decantation. After washing with water, the smeary paste crystallizes. The product is recrystallized from dilute methanol; in this manner 30 grams of N-[4-(β-<2-methoxy-5-chloro-benzamido>-ethyl) - benzenesulfonyl] - imino-dithiocarbonic acid dimethyl ester melting at 94–96° C. are obtained.

(c) N-[4-(β<2-methoxy - 5 - chloro-benzamido>ethyl)-benzenesulfonyl] - N' - cyclohexyl-isothiourea methyl ether.—4.73 grams of the ester obtained according to (b) are dissolved in 100 milliliters of dioxane, 1 gram of cyclohexylamine is added and the whole is heated for 1½ hours on the steam bath. Upon pouring of this mixture into water and acidification with hydrochloric acid, the above-indicated isothiourea is obtained in the form of a smeary paste.

(d) N - [4-(β-<2-methoxy-5-chloro-benzamido>-ethyl) - benzenesulfonyl]-N'-cyclohexyl-urea.—The smeary paste obtained according to (c) is dissolved in dioxane, binormal sodium hydroxide solution is added and the solution is heated for 1 hour on the steam bath. After having poured the whole into water and acidified with acetic acid, N-[4-(β-<2-methoxy-5-chloro-benzamido>-ethyl)-benzenesulfonyl]-N'-cyclohexyl urea is obtained in the form of a crystalline precipitate. After recrystallization from methanol, the substance melts at 170–172° C.

EXAMPLE 6

N-[4-(β-<2-methoxy-5-chloro-benzamido>-ethyl)-benzenesulfonyl]-N'-cyclohexyl-urea 75 grams of 4-(β-<2-methoxy-5-choro-benzamido>-ethyl)-benzenesulfonamide and 56.3 grams of ground potassium carbonate are suspended in 1.5 liters of acetone and the whole is heated for 3 hours under reflux. Then, 26.5 grams of cyclohexyl-isocyanate are added and heating is continued for 5 hours. The precipitate that has formed is filtered off with suction suspended in water and acidified with dilute hydrochloric acid. After filtration with suction there is obtained N-[4-(β-<2-methoxy-5-chloro-benzamido>-ethyl) - benzenesulfonyl]-N'-cyclohexyl-urea which, after recrystallization from methanol, melts at 172–173° C.

EXAMPLE 7

N-[4-(β-<2-methoxy-5-chloro-benzamido>-ethyl)-benzenesulfonyl]-N'-cyclohexyl-urea (a) 4.9 grams of 1-cyclohexyl-parabanic acid and 2.5 grams of triethylamine are dissolved in 200 milliliters of benzene and combined with 8.9 grams of 4-(β-<2-methoxy-5-benzamido>-ethyl)-benzenesulfochloride (melting point 102–103° C.). The mixture is heated for 3 hours under reflux and filtered hot from the triethylamine hydrochloride that has formed. The cooled filtrate is combined with petrol ether and the crystals which form after a short period of time are filtered off with suction. After two recrystallizations from methanol/dimethylformamide, there is obtained pure N-[4-(β-<2-methoxy-5-chloro-benzamido>-ethyl) - benzenesulfonyl]-3-cyclohexyl-parabanic acid melting at 211–212° C.

(b) 0.5 gram of the substance obtained according to (a) are heated for 45 minutes on the steam bath with 5 milliliters of dioxane and 10 milliliters of 1 N-sodium hydroxide solution. The whole is then combined with water, acidified and the precipitate obtained is recrystallized from methanol. The N-[4-(β-<2-methoxy-5-chlorobenzamido>-ethyl) - benzenesulfonyl] - N' - cyclohexylurea thus obtained melts at 170–171° C.

EXAMPLE 8

N-[4-(β-<2 - methoxy - 5 - bromo-benzamido>-ethyl)-benzenesulfonyl] - N' - (4 - methyl - cyclohexyl) - urea (trans)

(a) 17 grams of N-[4-<β-aminoethyl>-benzenesulfonyl]-N'-(4-methyl-cyclohexyl)-urea are stirred for 12 hours at 35–40° C. with 8.6 grams of 2-methoxybenzoic acid chloride and 9 grams of pyridine in 100 milliliters of chloroform. The whole is concentrated under reduced pressure, the residue is dissolved in a 1% soda solution, the by-products that have formed are separated by etherification and the soda-alkaline layer is acidified with dilute hydrochloric acid. The N-[4-(β-<2-methoxy-benzamido>-ethyl)-benzenesulfonyl]-N'-(4 - methyl-cyclohexyl)-urea is recrystallized from methanol and melts at 179–180° C.

(b) 9.5 grams of the urea obtained according to (a) are suspended in 100 milliliters of glacial acetic acid; to this suspension, 1.3 milliliter of bromine is dropwise added. The reaction mixture dissolves at first; later on, crystals separate. The whole is heated for 1 hour at 40° C., then nitrogen is passed for 1 hour through the reaction mixture, the reaction product that has precipitated is separated by filtration with suction and recrystallized from methanol. The N-[4-(β-<2-methoxy - 5 - bromobenzamido>-ethyl)-benzenesulfonyl] - N' - (4 - methyl-cyclohexyl)-urea (trans) melts at 190–191° C.

EXAMPLE 9

In a manner analogous to that described in Example 1, there are obtained

From 4-(β-<2 - isoamyloxy - 5 - methyl-benzamido>-ethyl)-benzenesulfonamide (melting point 152–153° C.);

N-[4 - (β-<2 - isoamyloxy - 5 - methyl-benzamido>-ethyl)-benzenesulfonyl]-N'-cyclohexyl-urea, melting point 163–164° C. (from methanol); and N-[4-(β - <2 - isoamyloxy - 5 - methyl-benzamido>-ethyl)-benzenesulfonyl]-N'-(4 - methyl - cyclohexyl)-urea (trans), melting point 156–158° C. (from methanol);

From 4-(β-<2 - isoamyloxy - 5 - chlorobenzamido>-ethyl)-benzenesulfonamide (melting point 147–148° C.);

N-[4-(β-<2 - isoamyloxy-5-chlorobenzamido>-ethyl)-benzenesulfonyl]-N'-cyclohexyl-urea, melting point 173–174° C. (from methanol); and N-[4-(β-<2 - isoamyloxy-5-chloro-benzamido>-ethyl)-benzenesulfonyl]-N'-(4 - methyl-cyclohexyl)-urea (trans), melting point 165–166° C. (from methanol).

We claim:

1. A composition suitable for oral administration and the lowering of blood sugar in the treatment of diabetes, said composition containing, in addition to a pharmaceutical diluent, 0.5 to 100 milligrams of a compound of the formula

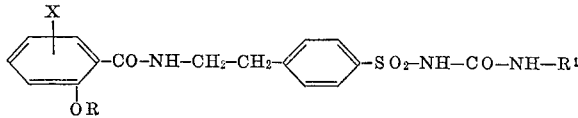

wherein

R represents alkyl of 1 to 5 carbon atoms or lower alkenyl,

X represents halogen, lower alkyl, or lower alkoxy, $R^1$ represents cyclohexyl, 4-methylcyclohexyl, 4-ethylcyclohexyl, endomethylene-cyclo-hexenylmethyl or endomethylene-cyclohexylmethyl, or a physiologically tolerable salt thereof as the essential active ingredient.

2. A composition as defined in claim 1 wherein X is chlorine, methyl or methoxy.

3. A composition as defined in claim 1 wherein the active ingredient is present in an amount of 2 to 10 milligrams.

4. A composition as defined in claim 1 wherein the active ingredient is N-[4-(β-[2-methoxy-5-chloro-benzamido]-ethyl)-benzenesulfonyl]-N'-cyclohexyl-urea.

5. A composition as defined in claim 4 wherein the active ingredient is present in an amount of 2 to 10 milligrams.

6. A tablet suitable for oral administration and lowering of blood sugar in the treatment of diabetes containing 0.5 to 100 milligrams of a compound as defined in claim 1.

7. A tablet as defined in claim 6 wherein the active compound is N-[4-(β-[2-methoxy-5-chlorobenzamido]-ethyl)-benzenesulfonyl]-N'-cyclohexyl-urea.

8. A tablet suitable for oral administration and lowering of blood sugar in the treatment of diabetes containing 0.5 to 100 milligrams of a compound as defined in claim 2.

9. A tablet suitable for oral administration and lowering of blood sugar in the treatment of diabetes containing 2 to 10 milligrams of a compound as defined in claim 1.

10. A tablet as defined in claim 9 wherein the active compound is N-[4-(β-[2-methoxy - 5 - chlorobenzamido]-ethyl)-benzenesulfonyl]-N'-cyclohexyl-urea.

11. A process for the lowering of blood sugar in the treatment of diabetes which comprises orally administering to an animal having diabetes from 0.5 to 100 milligrams of a compound as defined in claim 1.

12. Process as defined in claim 11 wherein the active compound is N-[4-(β-[2-methoxy-5-chloro-benzamido]-ethyl)-benzenesulfonyl]-N'-cyclohexyl-urea.

13. Process for the lowering of blood sugar in the treatment of diabetes which comprises orally administering to an animal having diabetes from 0.5 to 100 milligrams of a compound as defined in claim 2.

14. Process for the lowering of blood sugar in the treatment of diabetes which comprises orally administering to an animal having diabetes from 2 to 10 milligrams of a compound as defined in claim 1.

15. Process as defined in claim 14 wherein the active compound is N-[4-(β-[2-methoxy-5-chloro-benzamido]-ethyl)-benzenesulfonyl]-N'-cyclohexyl-urea.

References Cited

UNITED STATES PATENTS 3,320,312    5/1967    Sigal et al. _____ 424—321
3,426,067    2/1969    Weber et al. _____ 260—999

ALBERT T. MEYERS, Primary Examiner

J. D. GOLDBERG, Assistant Examiner